US006450481B1

(12) United States Patent
Oxtoby

(10) Patent No.: US 6,450,481 B1
(45) Date of Patent: Sep. 17, 2002

(54) TOE JACK

(75) Inventor: Darryl C. Oxtoby, Calgary (CA)

(73) Assignee: Hydra-Tech International Corporation, Calgary (CA)

(*) Notice: Subject to any disclaimer, the term of this patent is extended or adjusted under 35 U.S.C. 154(b) by 0 days.

(21) Appl. No.: 09/742,136

(22) Filed: Dec. 22, 2000

(51) Int. Cl.[7] .................................................. B60P 1/48

(52) U.S. Cl. .................................................. 254/93 H

(58) Field of Search ............................ 254/93 H, 93 R, 254/2 B, 2 R, 8 B, 8 R; 60/52 HA, 97 H, 472; 92/108; 91/412

(56) References Cited

U.S. PATENT DOCUMENTS 3,081,066 A * 3/1963 Murawski ................. 254/93 H
5,201,494 A * 4/1993 Lundman .................... 254/8 B

* cited by examiner

*Primary Examiner*—Robert C. Watson
(74) *Attorney, Agent, or Firm*—George A. Seaby

(57) ABSTRACT

A relatively simple toe jack includes a base; a cylinder mounted on the base and carrying a plunger; a load carrying sleeve mounted on the plunger; a load saddle and a load engaging toe on the sleeve; and a two-stage pump carrying a reservoir mounted on the base beside the cylinder, the pump including a handle specifically shaped to fit into a lever which operates the piston of the pump. The plunger is returned to a rest position by a spring mounted in the plunger and connected to the bottom of the cylinder.

5 Claims, 9 Drawing Sheets

TOE JACK

BACKGROUND OF THE INVENTION

1. Field of the Invention

This invention relates to a hydraulic jack and in particular to a toe jack.

2. Discussion of the Prior Art

So-called toe jacks are by no means new. In this connection reference is made to U.S. Pat. No. 2,165,367, issued to F. L. Gormley et al on Jul. 11, 1939; U.S. Pat. No. 2,412,414, issued to J. J. Mueller on Dec. 10, 1946; U.S. Pat. No. 2,469,670, issued to C. L. Thompson on May 10, 1949; U.S. Pat. No. 2,654,568, issued to W. S. Pine on Oct. 6, 1953; U.S. Pat. No. 3,081,066, issued to S. A. Murawski on March 12, 1963; U.S. Pat. No. 3,622,124, issued to K. R. Sidles et al on Nov. 23, 1971; U.S. Pat. No. 4,174,095, issued to D. L. Chipman on Nov. 13, 1979; U.S. Pat. No. 4,886,244, issued to J. Renault on Dec. 12, 1989; U.S. Pat. No. 5,048,794, issued to M. Mamessier on Sept. 17, 1991 and U.S. Pat. No. 5,524,868, issued to A. F. Decker et al on Jun. 11, 1996.

In general, existing jacks of the type in question suffer from a major problem, namely they operate at one speed. When the jack is placed under a load, it is often necessary to pump for a relatively long time before the load lifting element of the jack reaches the load. Because the load lifting element rises in small increments regardless of whether it is in engagement with the load, the pumping action must be repeated many times before the load is actually engaged and lifting starts.

Some jacks include a base, a piston securely mounted on the base, a load carrying cylinder mounted on the piston for vertical movement relative to the piston and base, and a pump body and a hydraulic fluid reservoir mounted on the cylinder. A handle connected to the pump body is used to pump hydraulic fluid from the reservoir to the cylinder. Thus, during pumping, the cylinder, the reservoir and the pump handle move upwardly as a unit with a load.

GENERAL DESCRIPTION OF THE INVENTION

An object of the present invention is to provide a relatively simple two-speed toe jack, i.e. a jack with load engaging elements which can be moved rapidly upwardly into engagement with a load and then slowly while lifting the load.

Another object of the invention is to provide a simple toe jack the bulk of which is fixedly mounted on a base, with only a piston or plunger and load carrying elements moving during a lifting operation. Thus, the center of gravity of the jack remains low, and when the jack is raised it does not become top heavy.

Accordingly, the invention relates to a hydraulic toe jack comprising:

(a) a base for supporting the jack on a support surface;

(b) a reservoir on said base for hydraulic fluid;

(c) a main cylinder on said base for receiving hydraulic fluid from said reservoir, (d) a plunger in said main cylinder for vertical movement relative to said base, said reservoir and said main cylinder;

(e) a load carrying sleeve on said plunger for vertical movement therewith;

(f) a toe on said sleeve for engaging a load; and (g) a two-stage pump on said base for pumping hydraulic fluid from said reservoir to said main cylinder at high volume and low pressure and at low volume and high pressure, whereby, during a pumping operation, the plunger and load carrying sleeve can be moved rapidly upwardly to engage a load and once in engagement with the load is moved slowly upwardly under high pressure.

BRIEF DESCRIPTION OF THE DRAWINGS

The invention is described below in greater detail with reference to the accompanying drawings which illustrate a preferred embodiment of the invention, and wherein.

DESCRIPTION OF THE PREFERRED EMBODIMENT

Figure 1:
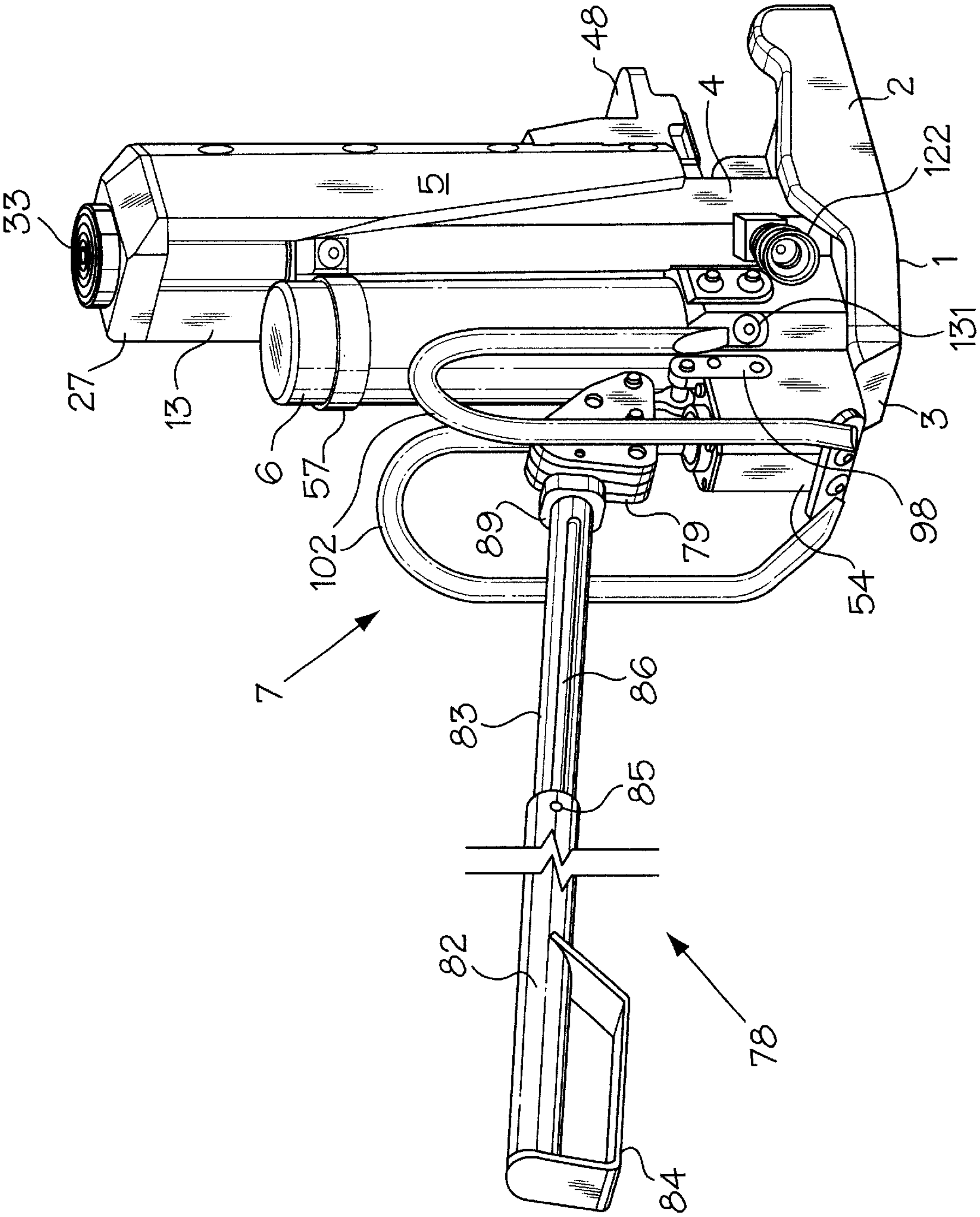
FIGS. 1 and 2 are isometric views of a toe jack in accordance with the invention as seen from opposite sides.
Figure 2:
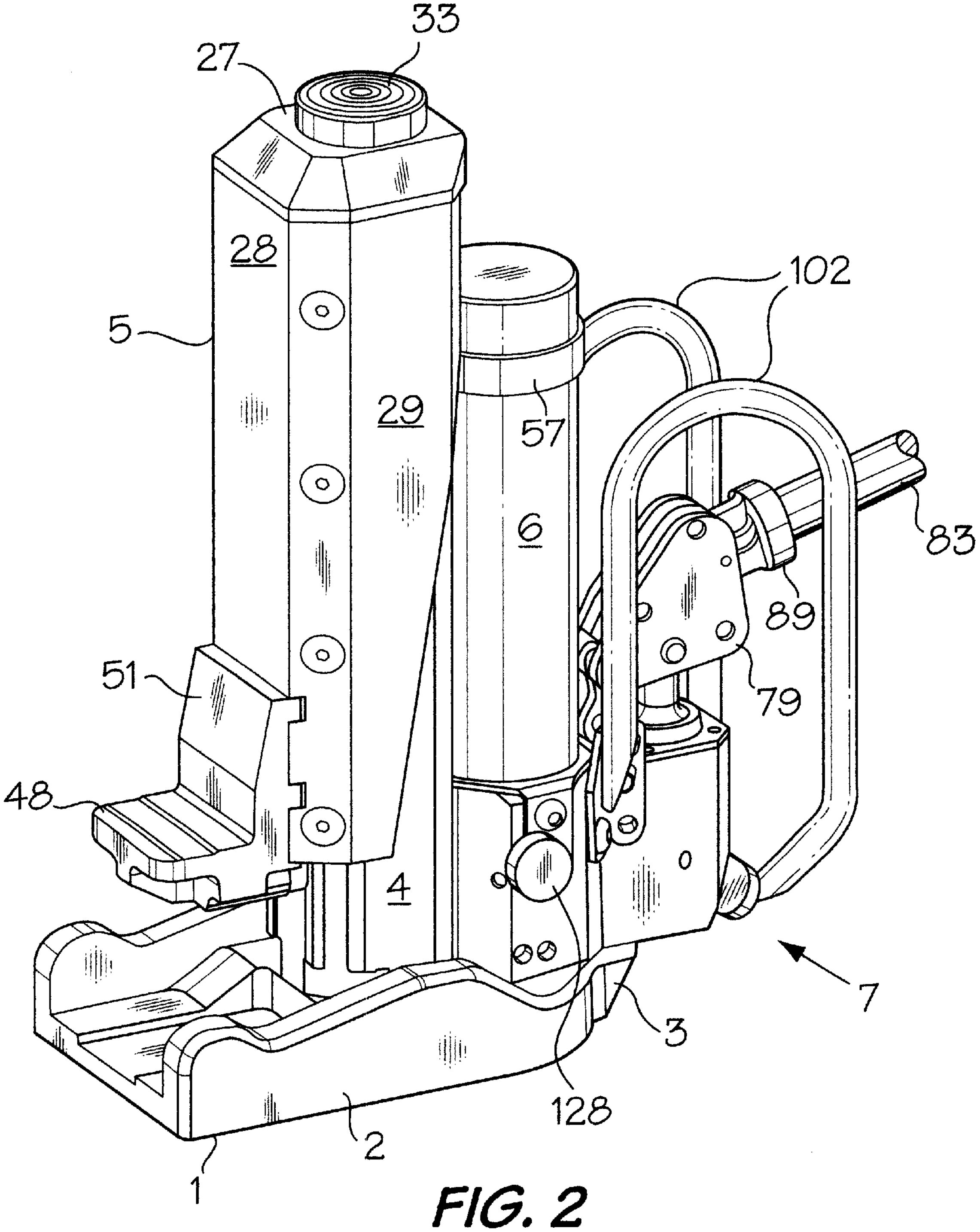

Referring to FIGS. 1 and 2, a pump jack in accordance with the invention includes a substantially planar base 1 with sides 2 and an end 3 defining a recess for receiving a cylinder 4, a toe mount or load carrying sleeve 5, a reservoir 6 and a two-stage pump assembly generally indicated at 7.

Figure 3:
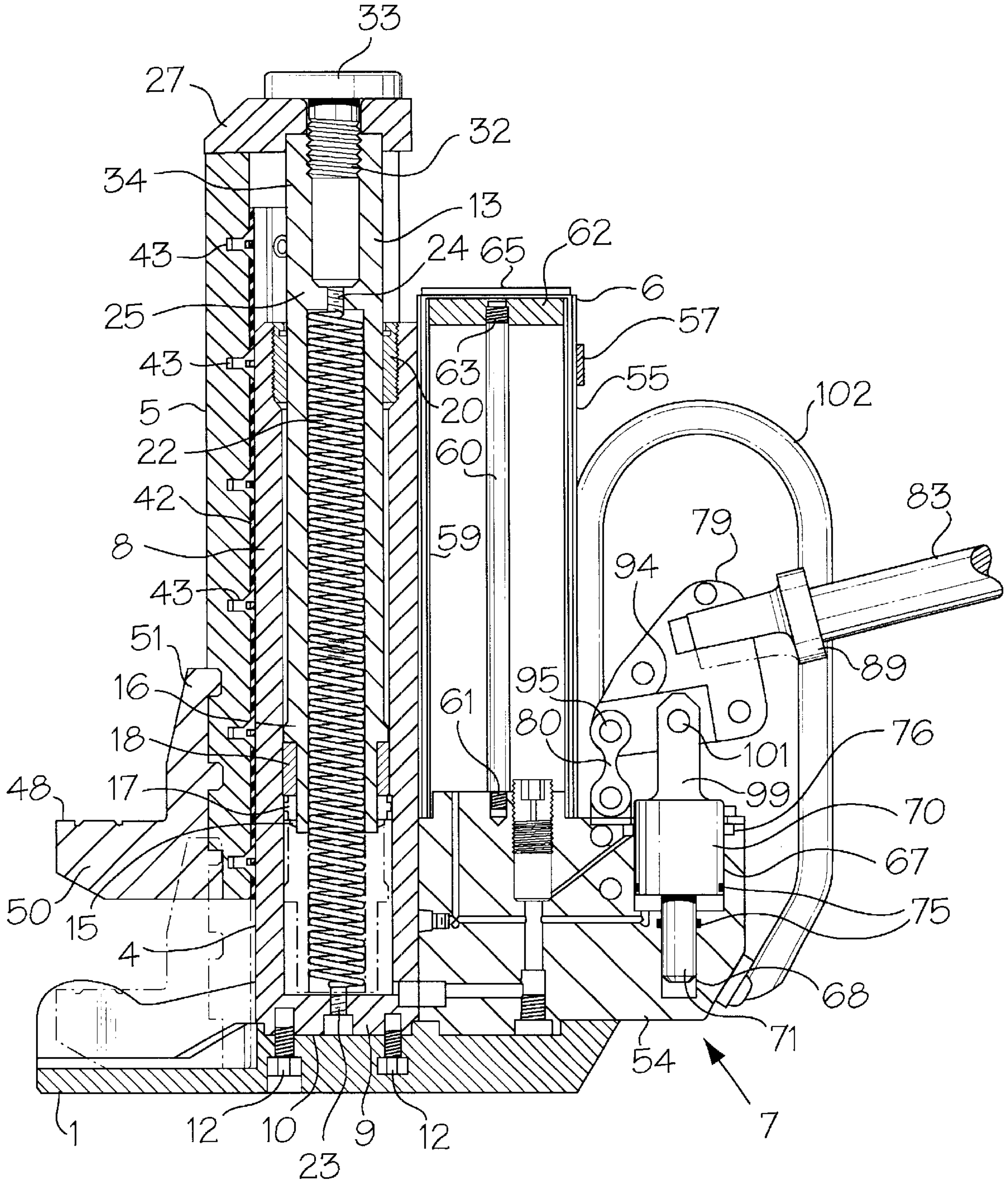
FIG. 3 is a longitudinal sectional view of the toe jack of FIGS. 1 and 2.

As best shown in FIG. 3 the cylinder 4 is defined by a tubular body 8 with a closed bottom end 9, which is securely mounted in a recess 10 in the top surface of the base 1 using bolts 12. A cylindrical piston or plunger 13 is slidably mounted in the cylinder 4. A snap ring and a washer (both designated 15) and an annular flange 16 on the plunger 13 retain a seal 17 and a brass wear sleeve 18 on the bottom end of the plunger 13. The top end of the plunger 13 extends through a gland nut 20 with a wiper (not shown) in the inner top end thereof. The plunger 13 is biased toward the lower, rest position shown phantom outline in FIG. 3 by a helical spring 22 extending between screws 23 and 24 in the bottom end 9 of the cylinder 4 and in a partition 25, respectively near the top end of the plunger 13.

Figure 4:
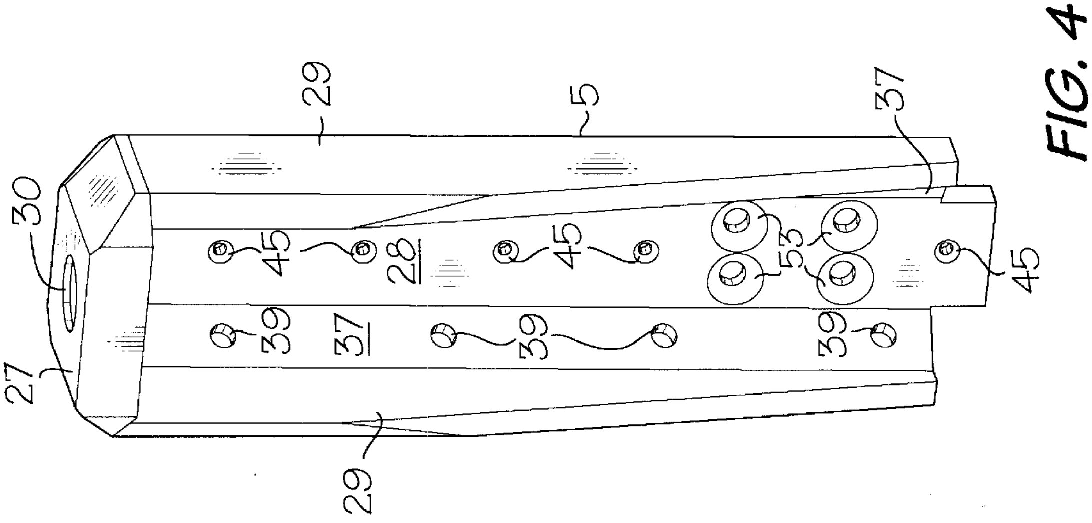
FIG. 4 is an isometric view of a load carrying sleeve used in the jack of FIGS. 1 and 2.

The plunger 13 carries the elongated load carrying sleeve 5, which has a polygonal cross section. Referring to FIG. 4, the load carrying sleeve 5 includes a top wall 27, a front wall 28 and a pair of side walls 29 integral with the front wall 28. A hole 30 in the top wall 27 receives the threaded stem 32 of a disc-shaped load saddle 33 (FIG. 3) for securely mounting the sleeve 5 on the internally threaded upper end 34 of the plunger 13. The rear end of the sleeve 5 is open for facilitating mounting of the sleeve on the plunger 13 and the cylinder 4.

Figure 5:
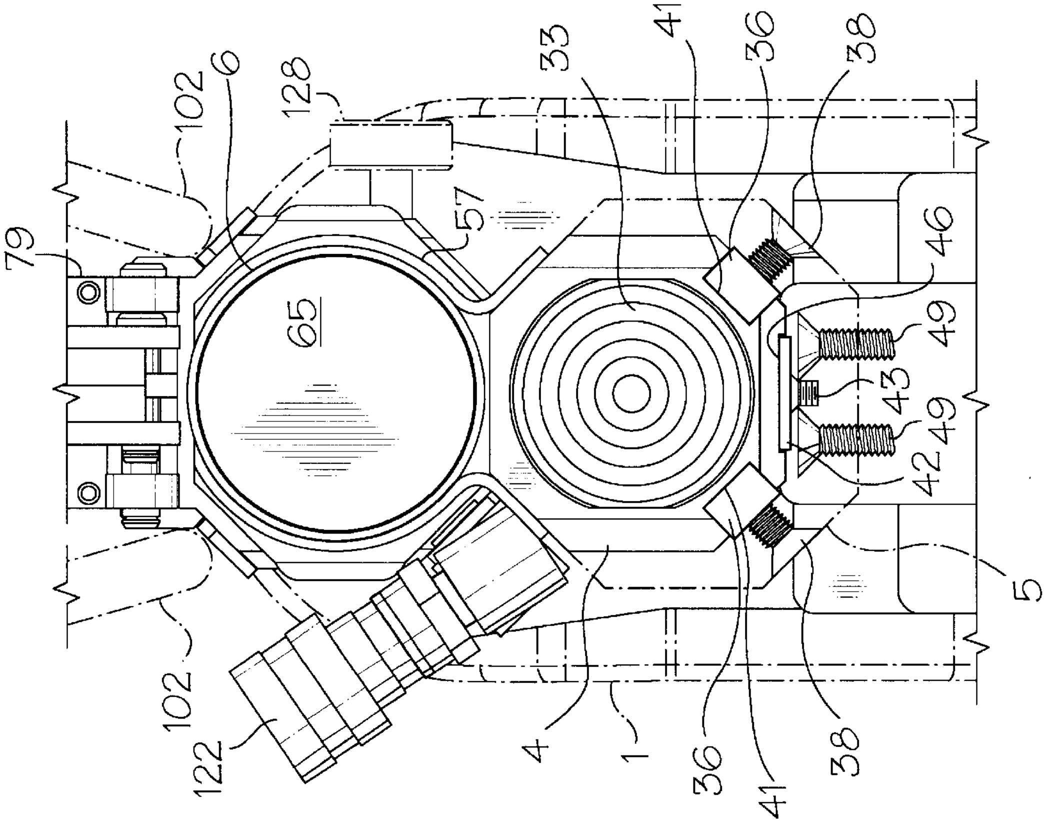
FIG. 5 is a top view of the central portion of the jack of FIGS. 1 and 2.
Figure 6:
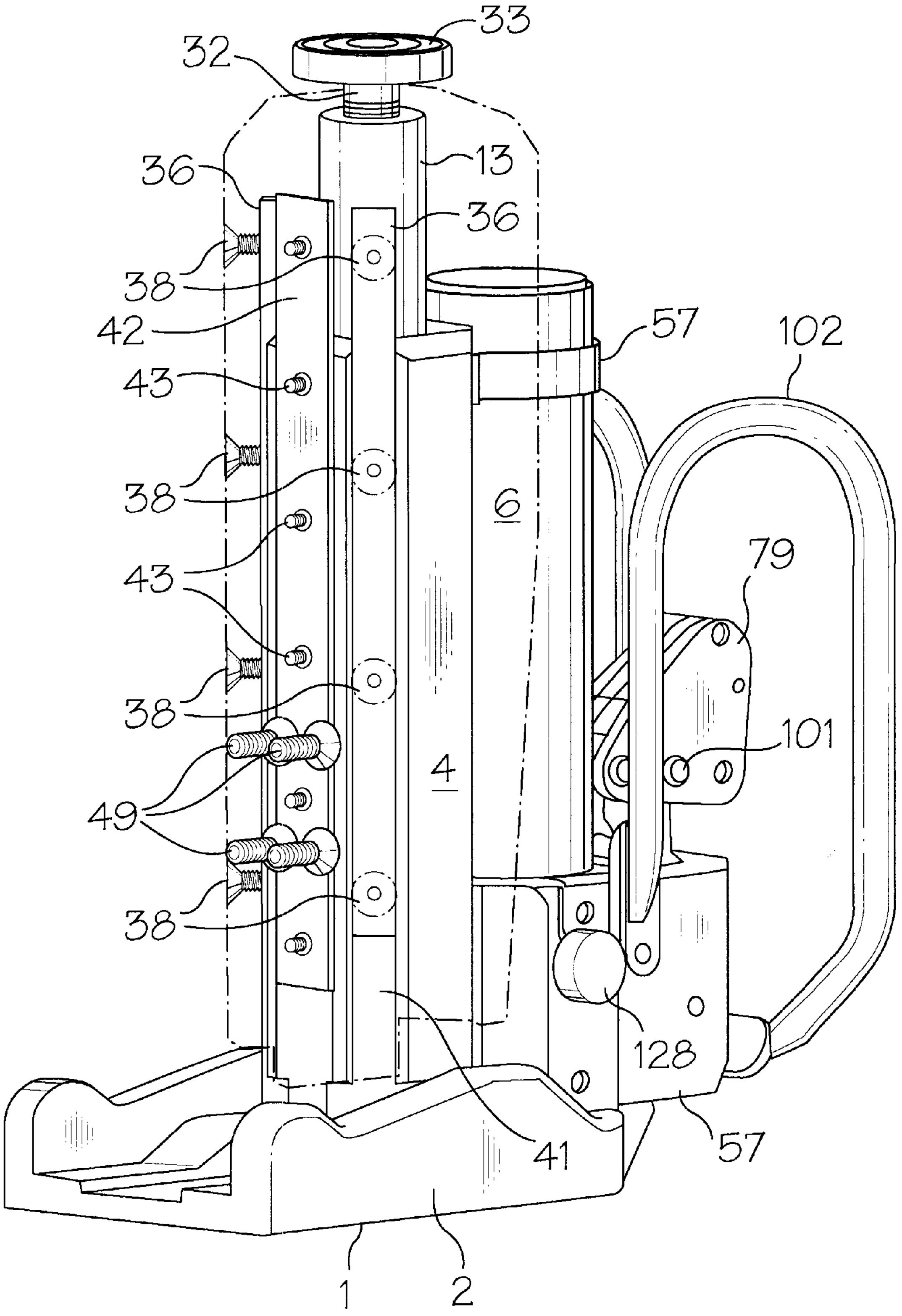
FIG. 6 is an isometric view of the jack of FIGS. 1 and 2 with the load carrying sleeve removed.

The sleeve 5 slides on the cylinder 4 with the plunger 13. For such purpose, a pair of brass keys or slides 36 (FIGS. 5 and 6) are mounted on the inside of front corners 37 of the sleeve 5 using bolts 38 which extend through holes 39 in such corners 37 into the slides 36. The slides 36 fit into rectangular cross section channels 41, in the front corners of the cylinder 4 (FIG. 5). When the cylinder 4 is actuated, the plunger 13 moves vertically carrying the sleeve 5 and the slides 36 therewith. A UHMW polyethylene wear strip 42 is attached to the interior of the front wall 28 of the sleeve 5 by bolts 43 extending through the strip 42 into threaded countersunk holes 45 in such front wall. The wear strip 42 slides in a shallow channel 46 (FIG. 5) in the front wall of the cylinder 4.

Figure 7:
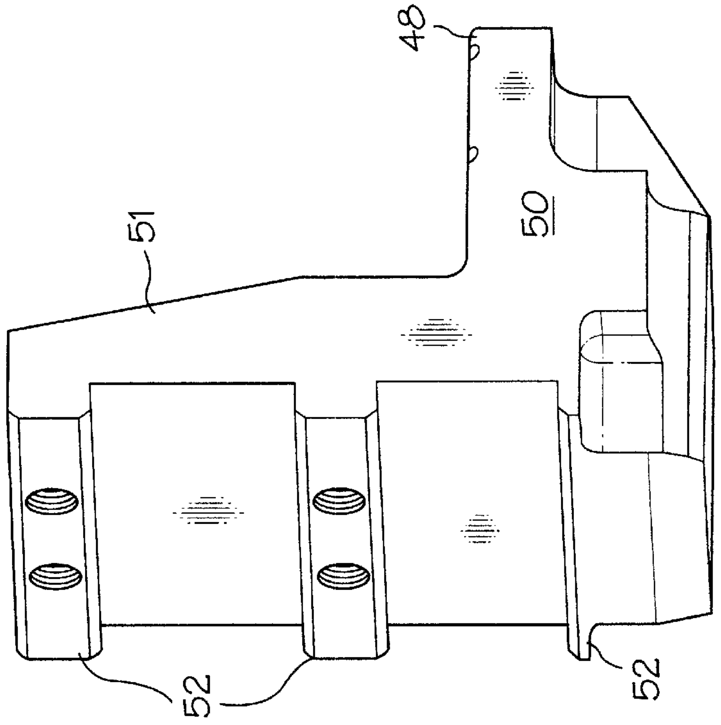
FIG. 7 is an isometric view of a toe used in the jack of FIGS. 1 and 2.
Figure 10:
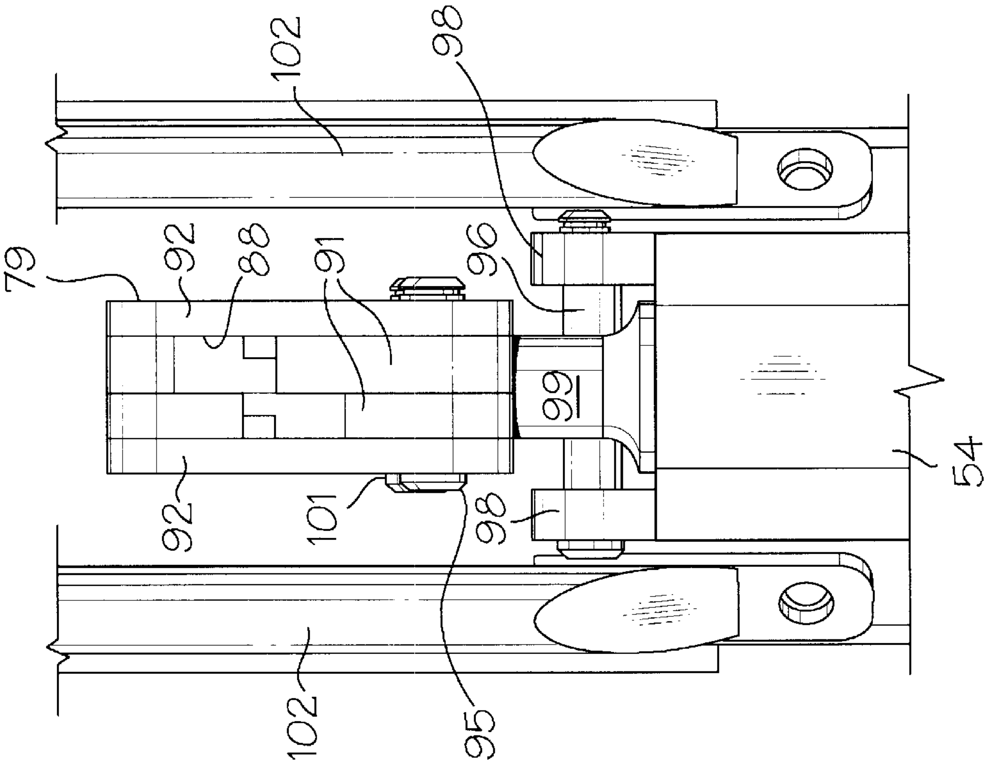
FIG. 10 is a front view of a lever used in the jack of FIGS. 1 and 2.

A load lifting toe 48 is mounted on the front wall 28 of the sleeve 5 using bolts 49. With particular reference to FIG. 7, the load lifting toe 48 is defined by a generally L-shaped body 50, the vertical arm 51 of which includes transversely extending rear projections 52 for mating with complementary grooves in the front wall 28 of the sleeve 5. The bolts 49 extend through holes 53 (FIG. 4) in the front wall 28 of the sleeve 5 into the top two projections 52. It will be appreciated that the use of the mating projections 52 and the grooves makes the toe assembly strong and facilitates replacement of the toe 48.

Figure 8:
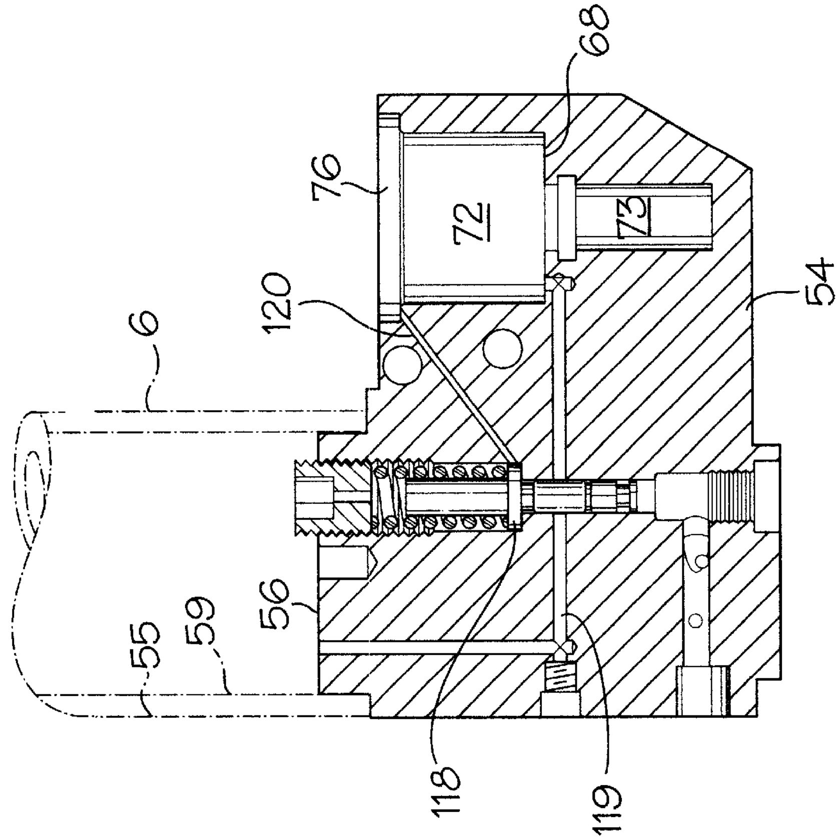
FIG. 8 is a cross section of a pump body used in the jack of FIGS. 1 and 2.

The cylinder 4 receives hydraulic fluid from the reservoir 6 via a pump body 54. As best shown in FIG. 8, the reservoir 6 includes a generally cylindrical housing 55 mounted on a cylindrical post 56 (FIG. 8) on the body 54. A bracket 57 (FIGS. 1 to 3, 5 and 6) extending around the top end of the housing 55 attaches the latter to the cylinder 4. A collapsible, cylindrical bladder 59 is provided in the housing 55. The bladder 59 is retained in an erect condition by a rod 60 (FIG. 3), the threaded bottom end 61 of which is mounted in the body 54, and a disc 62 which receives the threaded top end 63 of the rod 60. Clamps (not shown) extend around the top and bottom ends of the bladder 59 for retaining such ends on the post 56 and on the ring 62.

Hydraulic fluid is pumped from the reservoir 6 into the cylinder 4 using the two-stage pump assembly 7. The pump assembly 7 includes a piston 67 slidably mounted in a cavity or cylinder 68 in the pump body 54. The piston 67 has a large diameter (low pressure) upper section 70 and a smaller diameter (high pressure) lower section 71. The cavity 68 (FIG. 8) includes a complementary large diameter upper end 72 and a small diameter lower end 73. The piston 67 is sealed in the cavity using O-rings 75 (FIG. 3) and a wiper (not shown) in the top end 76 of the cavity 68.

The piston 67 is reciprocated in the cavity 68 by a two-part handle generally indicated at 78 (FIGS. 1 to 3) and a linkage defined by a triangular lever 79 and a link arm 80. The handle 78 includes two telescopically interconnected sections 82 and 83, one section 82 being tubular and the other section 83 being defined by a solid rod. A hand receiving loop 84 is provided on the free end of the tubular section 82. A pin 85 extends through the other end of the section 82 into a longitudinally extending groove or keyway 86 in the other section 83, whereby the length of the handle can be changed.

Figure 9:
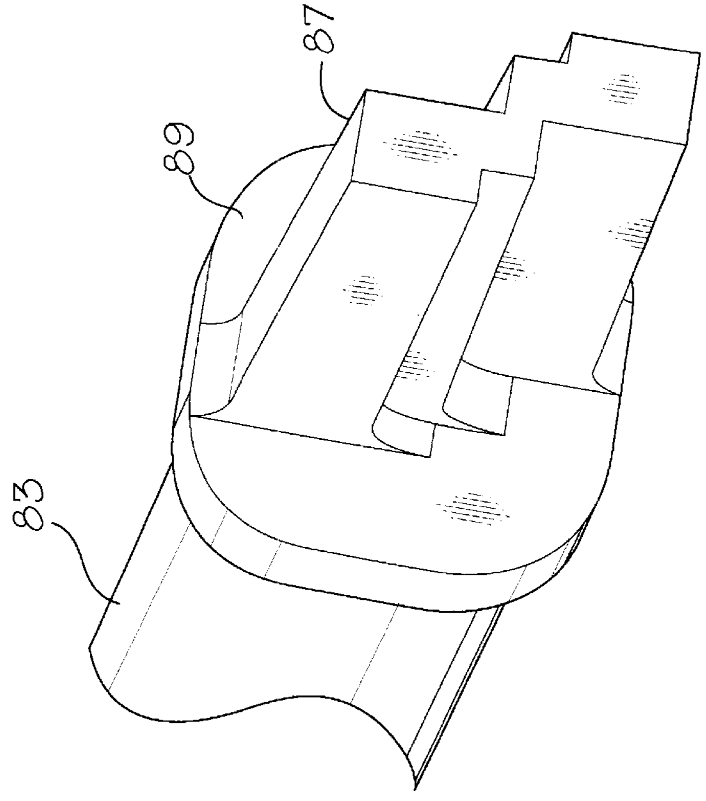
FIG. 9 is an isometric view of one end of a handle used in the jack of FIGS. 1 and 2.
Figure 11:
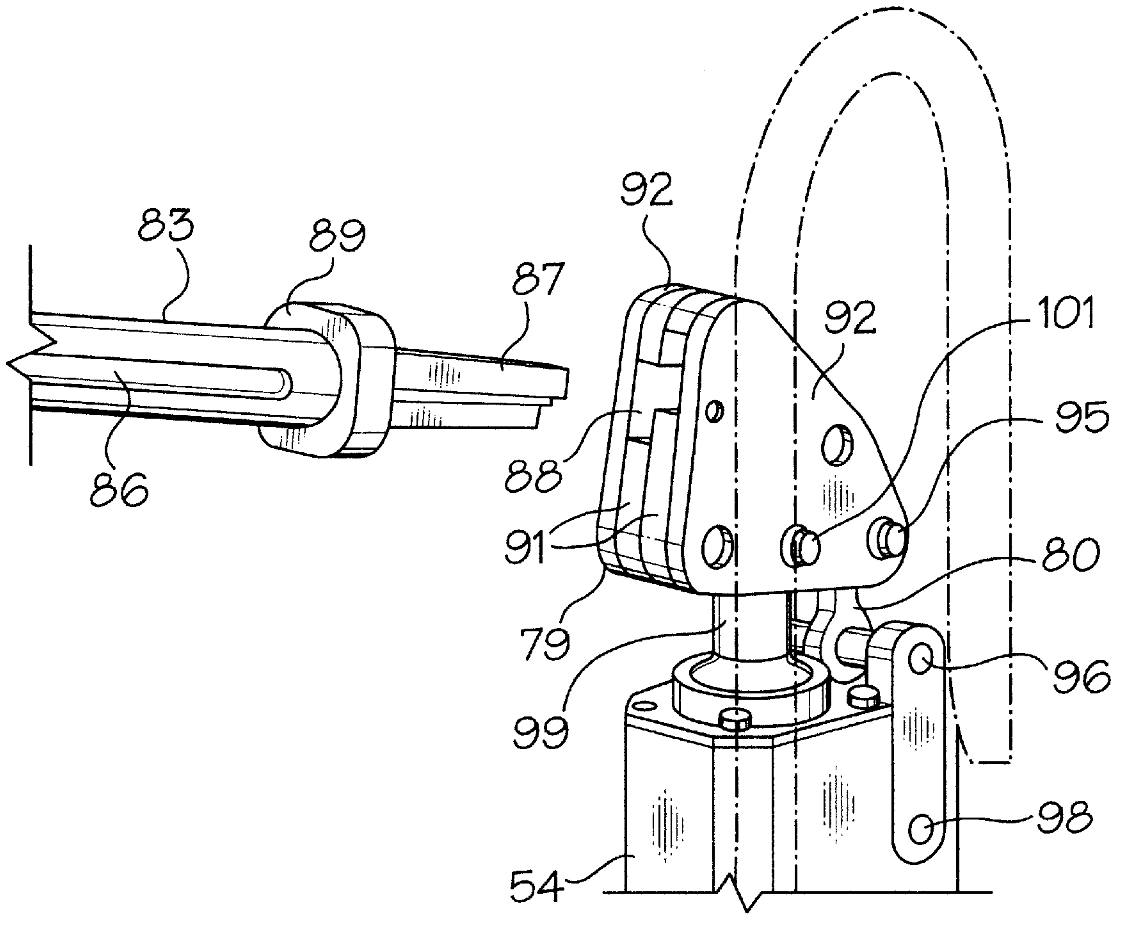
FIG. 11 is an isometric view of the lever of FIG. 10 and one end of the handle of FIG. 9.

The handle 78 is adapted to be removably mounted in the lever 79 and prevents the use of any handle 78 other than the one specifically designed for the jack of the present invention. For such purpose, the free end 87 of the narrow diameter section 83 of the handle 78 has a unique shape complementary to the shape of a handle receiving recess 88 in the lever 79. As best shown in FIG. 9, the free end 87 of the handle section 83 is stepped and tapers outwardly from a shoulder 89. The recess 88 has the same shape. The recess 88 in the lever 79 is formed by sandwiching intermediate plates 91 between substantially triangular side plates 92.

One corner of the lever 79 is pivotally connected to the pump body 54 by the link arm 80, the top end (FIG. 3) of which extends into a recess 94 in the bottom of the lever and is retained therein by a pin 95. The bottom end of the arm 80 is pivotally connected to the pump body 54 by a pin 96 extending between brackets 98 on the sides of the body 54. The top end 99 or stem of the piston 67 extends into the recess 94 at approximately the bottom center of the lever 79 and is retained therein by a pin 101. Generally inverted U-shaped handles 102 for lifting and positioning the pump are located on either side of the body 54 adjacent to the lever 79.

Figure 12:
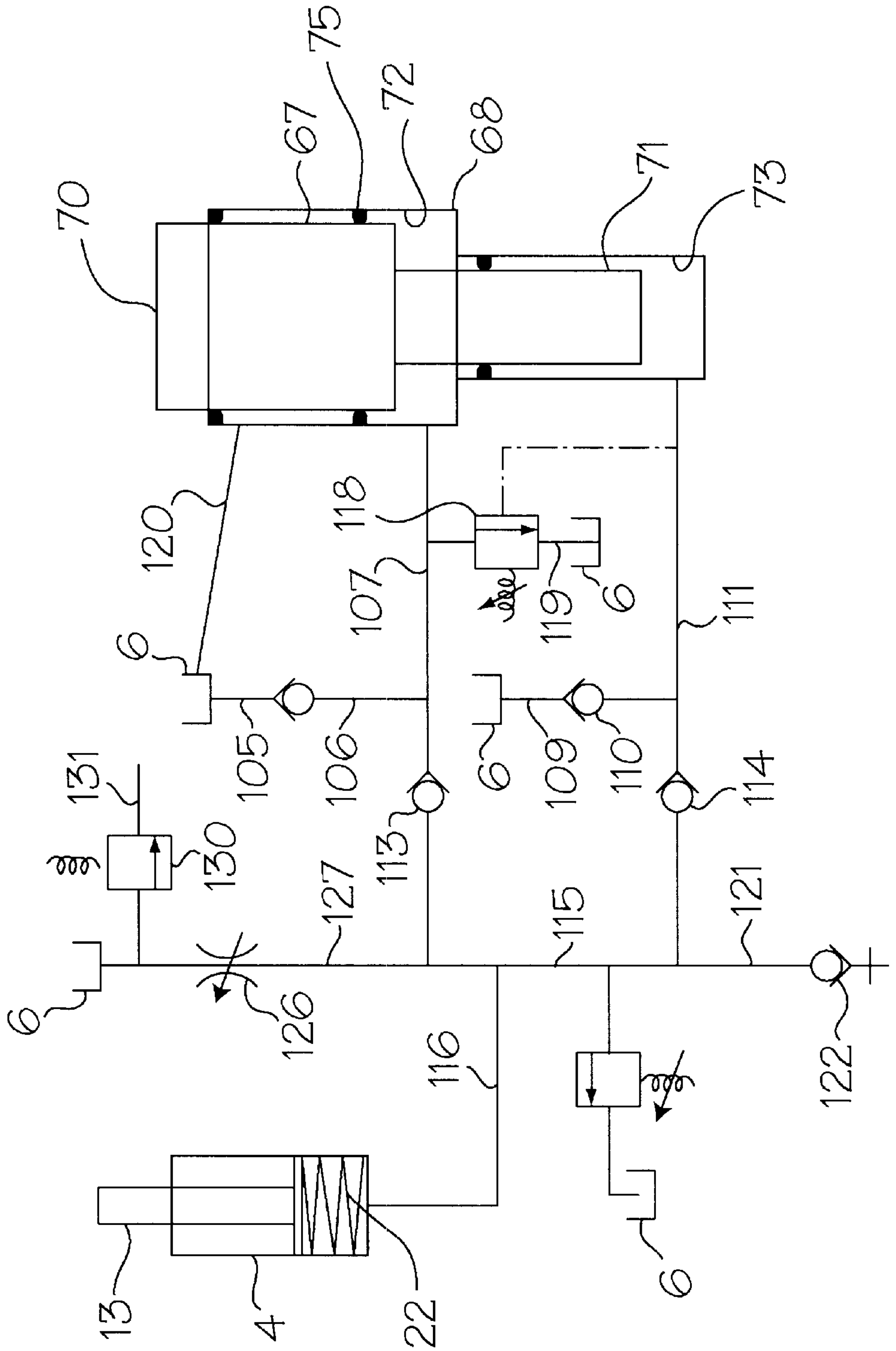
FIG. 12 is a schematic flow diagram of a hydraulic system used in the pump body of FIG. 8.

The flow path of hydraulic fluid in the pump is described below with reference to FIG. 12. In use the jack is placed beneath a load (not shown), to be lifted with the load saddle 33 or the toe 48 (as case may be) spaced apart from the load. The handle 78 is placed in the lever 79 and pumping is started. Upward movement of the piston 67 creates a partial vacuum in the hydraulic passages in the pump body 54. Fluid is drawn from the reservoir 6 via passage 105 and a check valve 106 into a passage 107 connected to the upper end 72 of the cavity or cylinder 68. At the same time, fluid is drawn from the reservoir 6 via passage 109 and a check valve 110 into a passage 111 connected to the lower end 73 of the cylinder 68. On the down stroke of the piston 67, the fluid is forced through one-way or check valves 113 and 114 in the lines 107 and 111, respectively to passages 115 and 116, which carry hydraulic fluid to the bottom end of the cylinder 4 causing the plunger 13 to rise rapidly in the cylinder. Thus, the large upper end 72 of the cylinder 68 provides for low pressure/high volume pumping, while the small lower end 73 provides for high pressure/low volume pumping. Under no load, both ends of the piston 67 force hydraulic fluid into the cylinder 4, thus rapidly filling the latter. With this arrangement the number of strokes required to fully raise the plunger 13 is much lower than with existing jacks.

Once the pressure in the line 107 or 111 exceeds a predetermined limit, a spring actuated valve 118 in a line 119 opens to dump hydraulic fluid from the low pressure cylinder end 72 to the reservoir 6. Any fluid leaking past the upper O-ring 75 in the piston 67 is contained by the wiper in the top end of the cavity or cylinder 68 and returned to the reservoir 6 via a drain line 120 (FIGS. 8 and 12).

If a large number of lifts are being performed, fluid can be pumped into a line 121 in the pump body 54 via a quick disconnect 122 on the pump body 54. The line 121 is connected by the lines 115 and 116 to the cylinder 4. The quick disconnect (FIG. 1) is used to connect the line 121 to a power operated pump (not shown). The spring 22 returns the plunger 13 to the lower, rest position, when a valve 126 in a line 127 is manually opened using a knob 128 (FIG. 2) on one side of the pump body 54 to return hydraulic fluid from the cylinder 4 to the reservoir 6. A bladder relief valve 130 is provided in a line 131 (FIGS. 1 and 12) in the body 54 for venting the reservoir to the outside in the event that the pressure in the line 127 exceeds a predetermined maximum if valve 126 has not been closed while using the external pump.

The apparatus described above is a ten ton jack with a wet weight (i.e. with the hydraulic fluid in the reservoir) of approximately fifty pounds. Because of the collapsible bladder, the pump can be operated in any orientation, e.g. sideways or even upside down. The unique pump handle to pump interface prevents the use of bastard handles which has been a safety concern in the past. The plunger is protected by the load carrying sleeve during lifting which limits or prevents malfunction due to plunger contact during normal operation.

I claim:

1. A hydraulic toe jack comprising:

(a) a base for supporting the jack on a support surface;

(b) a reservoir on said base for hydraulic fluid;

(c) a main cylinder on said base for receiving hydraulic fluid from said reservoir;

(d) a plunger in said main cylinder for vertical movement relative to said base, said reservoir and said main cylinder;

(e) a load carrying sleeve on said plunger for vertical movement therewith;

(f) a toe on said sleeve for engaging a load; and (g) a two-stage pump on said base for pumping hydraulic fluid from said reservoir to said main cylinder at high volume and low pressure and at low volume and high pressure, including:

(i) a pump body on said base supporting said reservoir;

(ii) a cavity in said pump body having a large diameter upper end and a smaller diameter lower end;

(iii) a piston slidable in said cavity having a large diameter upper section for sliding in said upper end of the cavity, and a small diameter lower section for sliding in said lower end of said cavity; and (iv) a handle for manual reciprocation of said piston in said cavity, whereby, during a pumping operation, the plunger and load carrying sleeve can be moved rapidly upwardly to engage a load and, once in engagement with the load, the plunger and load carrying sleeve can move slowly upwardly under high pressure.

2. The hydraulic jack of claim 1, a helical spring in said plunger, said spring connecting the plunger to the base for biasing the plunger to a rest position, whereby the plunger is returned to a rest position at the end of a lifting operation when pressure in said main cylinder is released.

3. The hydraulic jack of claim 1, wherein said load carrying sleeve is polygonal in cross section including a front wall and a pair of side walls integral with said front wall.

4. The hydraulic jack of claim 3, including slides in said sleeve for sliding on said main cylinder when the plunger and sleeve are moved relative to the main cylinder; and a plastic wear strip on an interior of said front wall of the sleeve; and a channel in said cylinder for slidably receiving said wear strip.

5. The hydraulic jack of claim 4, wherein said pump includes a lever pivotally connected to said pump body for reciprocating said piston in said cavity; a stepped, tapered recess in said lever; and a stepped, tapered end on said handle having the same shape as said recess, whereby only a handle having a proper shape can be used to actuate the pump.

* * * * *